United States Patent [19]

Schneider

[11] Patent Number: 5,065,991
[45] Date of Patent: Nov. 19, 1991

[54] APPARATUS FOR FIXING A WORKPIECE TO THE WORKTABLE OF A MACHINE TOOL

[75] Inventor: Rudolf Schneider, Stansstad, Switzerland

[73] Assignee: Erowa AG, Reinach, Switzerland

[21] Appl. No.: 533,876

[22] Filed: Jun. 6, 1990

[30] Foreign Application Priority Data

Jun. 10, 1989 [DE] Fed. Rep. of Germany ....... 3919077

[51] Int. Cl.$^5$ .............................................. B23Q 1/08
[52] U.S. Cl. ................................................. 269/309
[58] Field of Search ................ 269/56, 309, 310, 329, 269/20, 900; 404/219, 220, 225, 218; 198/345; 33/180 R; 29/559, 563, 464, 33 P

[56] References Cited

U.S. PATENT DOCUMENTS

| | | | |
|---|---|---|---|
| 4,586,702 | 5/1986 | Chambers | 269/310 |
| 4,610,020 | 9/1986 | Fiandra | 269/309 |
| 4,735,671 | 4/1988 | Stoffel et al. | 269/310 |
| 4,928,939 | 5/1990 | Bell | 269/309 |
| 4,932,642 | 6/1990 | Salenbien et al. | 269/310 |
| 4,934,680 | 6/1990 | Schneider | 269/309 |

*Primary Examiner*—Robert C. Watson
*Attorney, Agent, or Firm*—Tarolli, Sundheim & Covell

[57] ABSTRACT

The invention provides an apparatus for fixing a workpiece to be machined by a machine tool to the worktable of the machine tool in an exactly determined positional relationship with reference to a reference point located on the worktable of the machine tool. The apparatus of the invention comprises a workpiece receiving means adapted to removably receive the workpiece to be machined, and first positioning means comprising a first group of positioning apertures provided in the workpiece receiving means, and a first group of positioning studs provided on the worktable of the machining tool, said first group of positioning apertures and said first group of positioning studs cooperating to determine the position of the workpiece receiving means in X- and Y-direction.

Further, there are provided second positioning means comprising a second group of positioning apertures and a second group of positioning studs, said second groups of positioning apertures and positioning studs being located distantly from said first groups of positioning apertures and positioning studs and cooperating with each other. The cooperating second groups of positioning apertures and positioning studs determine the position of the workpiece receiving means either only in X-direction or only in Y-direction, but not simultaneously in both directions.

11 Claims, 7 Drawing Sheets

APPARATUS FOR FIXING A WORKPIECE TO THE WORKTABLE OF A MACHINE TOOL

BACKGROUND OF THE INVENTION

1. Field of the Invention

The present invention refers to an apparatus for fixing a workpiece to be machined by a machine tool to the worktable of said machine tool in an exactly determined positional relationship with reference to a reference point located on said worktable of said machine tool. The apparatus comprises a workpiece receiving means adapted to removably receive said workpiece to be machined, and first positioning means comprising a first group of positioning apertures provided in said workpiece receiving means and a first group of positioning studs provided on said worktable of said machining tool, said first group of positioning apertures and said first group of positioning studs co-operating to determine the position of the workpiece receiving means in X- and Y-direction.

It is often required to fix a workpiece to be machined by a machine tool in an exactly known, well defined relationship in the working area of a machine tool, particularly with reference to the worktable of a machine tool. Particularly, an exact and precisely known positioning of a workpiece to be machined must be achieved with reference to two perpendicularly running directions, i.e. the X-direction and the Y-direction, as well with reference to a rotation around the Z-axis, i.e. the axis running perpendicularly through the section of said X-axis and said Y-axis. Additionally, sometimes it is required that the workpiece be exactly positioned with reference to said aforementioned Z-axis, i.e. with reference to its height position above said X-Y-plane and with reference to its parallelity to the X-Y-plane.

2. Prior Art

It is well known in the prior art to provide workpiece positioning means adapted to position comparatively small workpieces. These positioning means comprise a workpiece receiving means adapted to receive a workpiece to be machined, as well as a base member mounted on the worktable of the machining apparatus and cooperating with said workpiece receiving means. The positioning is effected by means of protruding positioning studs provided on said base member and correspondingly arranged positioning apertures provided on said workpiece receiving means; as soon as the workpiece receiving means is coupled with the base member, the positioning studs engage the positioning apertures to center the workpiece connected to the workpiece receiving means.

Taking the positioning along the extension of the Z-axis not in account, it is basically sufficient to provide two pairs of cooperating studs and apertures; the first pair can provide a positioning in X- and Y-direction and the second pair can provide, in cooperation with the first pair, a well defined angular orientation around the Z-axis.

An essential prerequisite with such known apparatusses for the positioning of workpieces is that the positioning studs, on the one hand, and the positioning studs, on the other hand, are very precisely located as far as their relative position vis-a-vis each other is concerned. With other words, the distance between e.g. two positioning studs must be exactly equal to the distance between two positioning apertures cooperating with said positioning studs in order to achieve a flawless cooperation between positioning studs and positioning apertures and thereby the desired positioning of the workpiece receiving means with reference to the base member (the position thereof being well known). The result is that these parts must be manufactured with an extremely high degree of precision, particularly if an extremely high degree of positioning accuracy is required as it is the case in the field of electro erosive machining of workpieces. Thus, the manufacture of such a high precision positioning apparatus, even if it is suited only for small workpieces, is very expensive and time-consuming. In addition, such a known arrangement is often geometrically overdefined, particularly if as in most cases conically shaped positioning studs are used because in this case both stud-aperture-pairs determine the X-Y-position independently from each other.

These problems and disadvantages are particularly important in the case if relatively big workpieces have to be exactly positioned. Basically, in the interest of a stable positioning and fixing of the workpiece, the distance between the positioning studs and positioning apertures, respectively, is choosen as great as possible. However, even in the region of distances between 20 and 40 cm between the stud-aperture-pairs, deviations may be observed which are caused by thermic contraction or expansion due to thermal differences between the workpiece receiving means and the base member. Thus, a flawless engagement of one or the other positioning stud in its related positioning aperture is impaired. The result is that the high precision particularly required in the manufacture of precision tools is no longer warranted.

Another problem may be observed when different workpiece receiving means are to be connected to one and the same base member. The workpiece receiving means probably have been manufactured in different manufacturing batches and, therefore, do not have exactly the same dimensions. Even if such deviations in dimension might be small, they nevertheless can severely impair the precision of the positioning of the workpiece receiving means with reference to the exactly positioned base member, an impairment which can not be tolerated in precision tool manufacturing.

The British Patent No. 2 033 263 discloses an apparatus for clamping a workpiece on the worktable of a machine tool in an exactly defined position. Said apparatus comprises a workpiece receiving means to which the workpiece to be machined is releasably fixed and which is provided with positioning recesses cooperating with positioning studs correspondingly arranged on the worktable of the machining apparatus and projecting over the surface thereof. This apparatus comprises, in particular, a workpiece receiving pallet having four V-grooves arranged in the region of the four corners of said pallet; these V-grooves essentially correspond to the positioning apertures mentioned hereinbefore. The V-grooves cooperate with correspondingly arranged V-blocks in order to position the pallet in X- and Y-direction. Thus, a group of four aperture-stud-pairs is disclosed being arranged in relatively great distance from each other and which perform the entire positioning function. It is evident for every person skilled in the art that the positioning accuracy of the pallet on the worktable of the machine tool solely depends on the manufacturing precision and on the actual position of the V-grooves and the V-blocks. The design is geometrically overdefined, and even the least deviation in the position of one of the V-grooves in the pallet will impair the exact position of the pallet with reference to the worktable of the machine tool. Such a deviation may easily occur if pallets are used which origin from different manufacturing batches or which have different temperature.

The German Patent No. 31 15 586 discloses an apparatus for exchanging and positioning pallets in a machine tool; said apparatus comprises a delivering track on which the pallets loaded with a workpiece are fed to a pallet receiving and workpiece machining station. After the pallet having reached this station, the pallet is lowered until it rests on the top surface of Z-axis centering pins which, however, do not have any centering or positioning function in X- or Y-direction. On the other hand, during the lowering of the pallet, the top portions of the conical centering pins engage correspondingly conically designed centering bushes. These bushes are resilient in axial direction, but rigid in radial direction. It is said in the aforementioned German Patent that thereby "an exact positioning of the pallet on the centering pin in radial direction" should be achieved.

However, as should be clear to every person skilled in the art, it is not possible to obtain an exact positioning of the pallet in X- and Y-direction nor with reference to the angular orientation around the Z-axis with this design, particularly if the distance between the centering pins and the distance between the centering bushes is not exactly equal. If the aforementioned distances are not exactly equal, the position of the pallet is not well defined because, depending on the initial position of the pallet prior to lowering it, either the one pin-bush-pair or the other pin-bush-pair exactly engages and determines the position of the pallet. The result is that the pallet can take two different positions; a condition which should be avoided by the present invention.

OBJECTS OF THE INVENTION

It is an object of the invention to provide an apparatus for fixing a workpiece to be machined by a machine tool to the worktable of said machine tool in an exactly determined positional relationship with reference to a reference point located on said worktable of said machine tool which avoids the disadvantages of the prior art designs discussed hereinbefore.

It is a further object of the invention to provide an apparatus for fixing a workpiece to be machined by a machine tool to the worktable of said machine tool in an exactly determined positional relationship with reference to a reference point located on said worktable of said machine tool which renders possible to exactly and definedly position the workpiece even if the distance between centering pins and centering apertures differs due to manufacturing tolerances.

It is a still further object of the invention to provide an apparatus for fixing a workpiece to be machined by a machine tool to the worktable of said machine tool in an exactly determined positional relationship with reference to a reference point located on said worktable of said machine tool which renders possible to exactly position the workpiece even if the distance between centering pins and centering apertures differs due to thermal expansion or contraction of the workpiece receiving means and/or the base member.

SUMMARY OF THE INVENTION

In order to achieve these and other objects, the invention provides, according to a first aspect, an apparatus for fixing a workpiece to be machined by a machine tool to the worktable of said machine tool in an exactly determined positional relationship with reference to a reference point located on said worktable of said machine tool. The apparatus comprises a workpiece receiving means adapted to removably receive said workpiece to be machined, and first positioning means comprising a first group of positioning apertures provided in said workpiece receiving means and a first group of positioning studs provided on said worktable of said machining tool. The first group of positioning apertures and the first group of positioning studs cooperate to determine the position of the workpiece receiving means in X- and Y-direction.

Further provided are second positioning means comprising a second group of positioning apertures and a second group of positioning studs. The second groups of positioning apertures and positioning studs are located distantly from said first groups of positioning apertures and positioning studs and cooperate with each other. The cooperating second groups of positioning apertures and positioning studs determine the position of the workpiece receiving means either only in X-direction or only in Y-direction, but not in both X- and Y-directions simultaneously.

Particularly suited for very large workpieces, according to a second aspect of the invention, there is provided an apparatus for fixing a workpiece to be machined by a machine tool to the worktable of said machine tool in an exactly determined positional relationship with reference to a reference point located on said worktable of said machine tool. This apparatus comprises a workpiece receiving means adapted to removably receive the workpiece to be machined, first positioning means comprising a first group of positioning apertures provided in the workpiece receiving means and a first group of positioning studs provided on the worktable of the machining tool, said first group of positioning apertures and said first group of positioning studs cooperating to determine the position of the workpiece receiving means in X- and Y-direction.

Further provided are second positioning means comprising a second group of positioning apertures and a second group of positioning studs. The second group of positioning apertures and positioning studs is located distantly from the first group of positioning apertures and positioning studs and the positioning studs and positioning apertures of said second group cooperate with each other. The cooperating second group of positioning apertures and positioning studs determines the position of the workpiece receiving means only in X-direction.

Finally, third positioning means are provided comprising a third group of positioning apertures and a third group of positioning studs. Said third group of positioning apertures and positioning studs is also located distantly from said first and second groups of positioning apertures and positioning studs and the positioning studs as well as the positioning apertures of said third group cooperate with each other. The cooperating third group of positioning apertures and positioning studs determines the position of the workpiece receiving means only in Y-direction.

With this design, e.g. in the case when two groups of studs and apertures are provided, it may be ensured that the one group is responsible for the exact positioning of the workpiece receiving means in X- and Y-direction, thereby determining the reference for the perpendicularly running Z-axis, while the other group exactly positions the workpiece receiving means with reference to its position around the Z-axis. The mutual distance between the two groups of studs and apertures is no longer critical because only one group is responsible for the definition of the Z-axis. Thus, manufacturing tolerances, thermal dimension deviations etc. can not have an impairing effect on the positional accuracy and a geometrical overdefinition of the position of the workpiece receiving means on the worktable of the machine tool is avoided.

BRIEF DESCRIPTION OF THE DRAWINGS

In the following, some embodiments of the apparatus according to the invention will be further described, with reference to the accompanying drawings, in which.

DESCRIPTION OF SOME PREFERRED EMBODIMENTS

Figure 1:
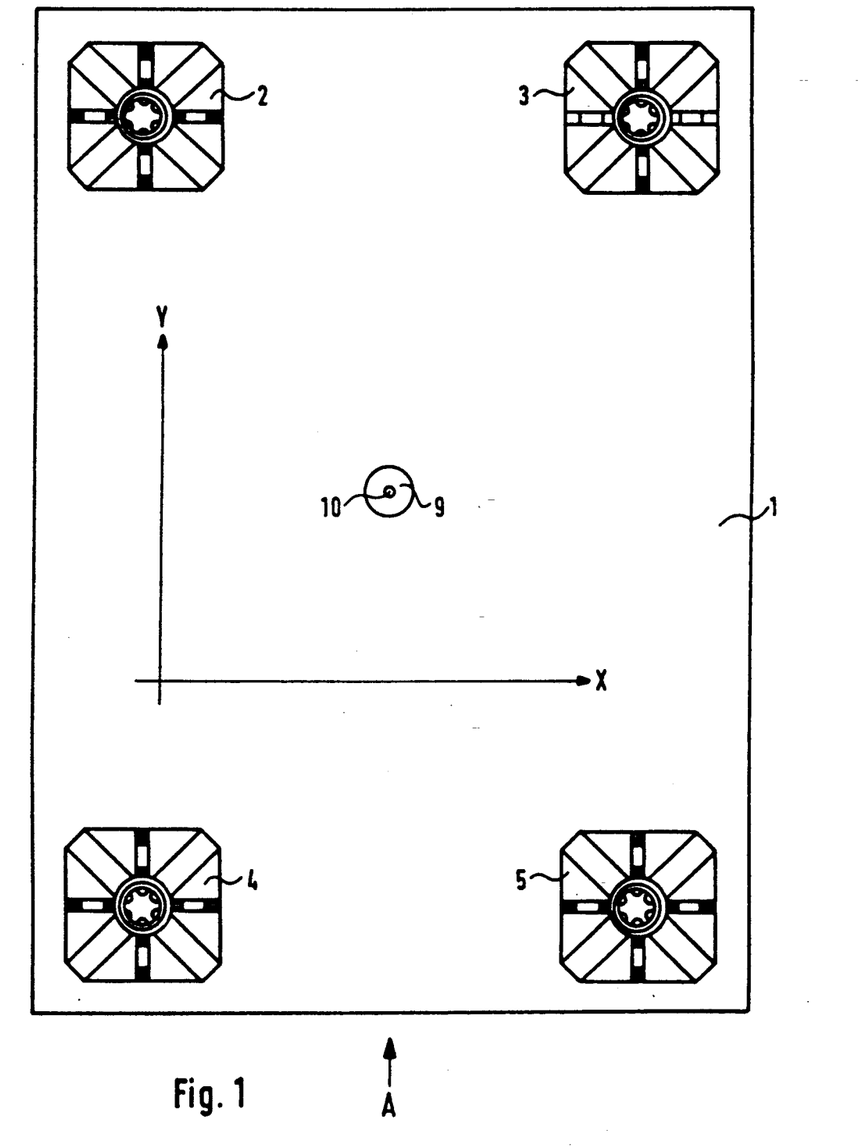
FIG. 1 shows a top view of a worktable of a machine tool which is equipped with four groups of positioning studs.

According to FIG. 1, there is schematically shown in worktable 1 of a machine tool. The surface of the worktable 1 is provided with four base members 2, 3, 4 and 5. Each of said base members includes a plurality of positioning studs. The particular design of the base members 2, 3, 4 and 5 will be further described in detail in connection with the description of FIGS. 4 and 5 hereinafter. Advantageously, all four base members 2, 3, 4, and 5 have identical design.

Figure 2:
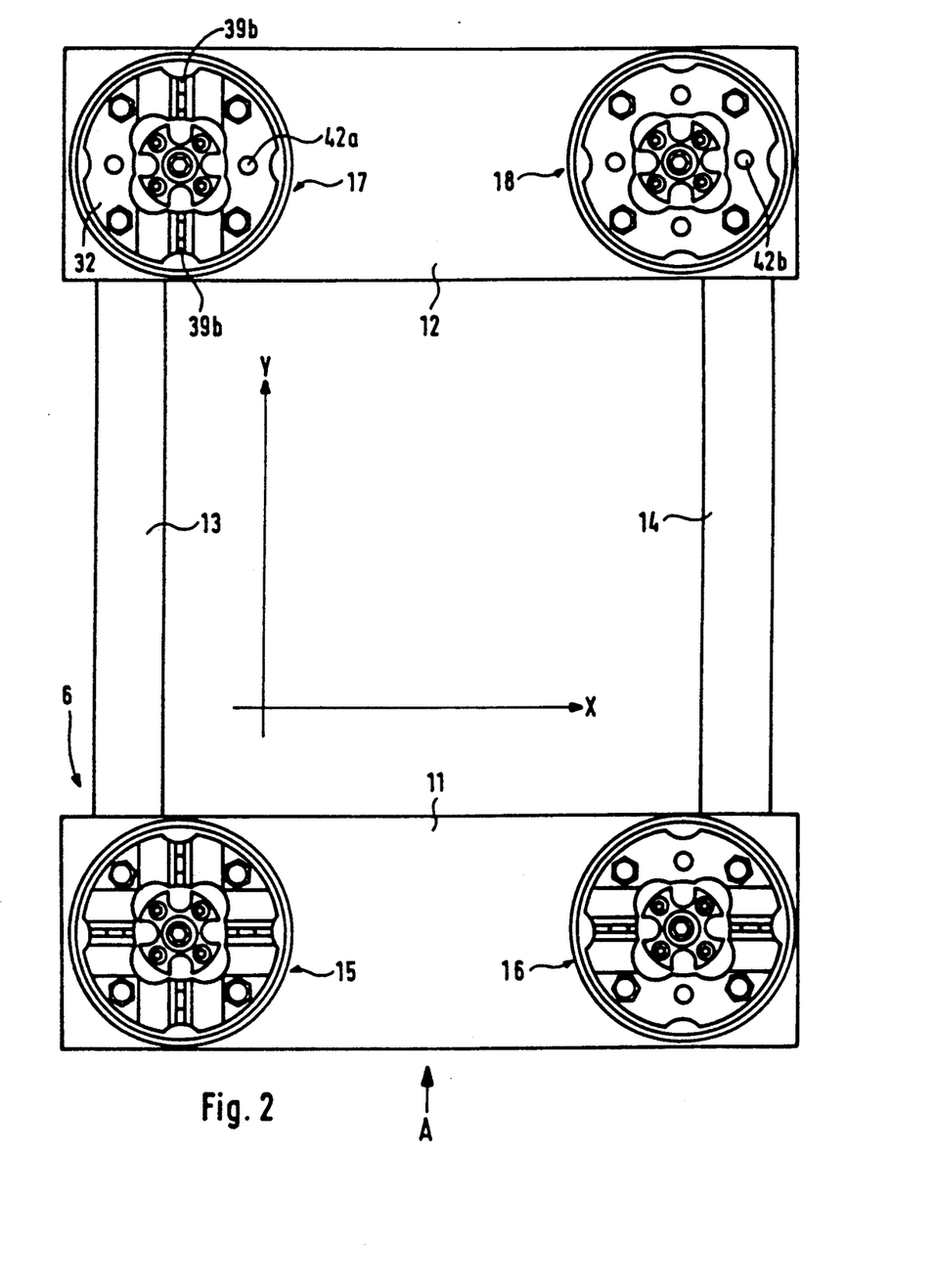
FIG. 2 shows a bottom view of a first embodiment of a workpiece receiving means which is equipped with four groups of positioning apertures.

According to FIG. 2, there is shown a bottom view of a workpiece receiving frame 6, i.e. in a view towards the side of the workpiece receiving frame facing the top of the worktable 1. The workpiece receiving frame 6 is provided at each of its four corners with a group of positioning apertures; the design of this positioning apertures will be further explained hereinafter in detail.

Figure 2A:
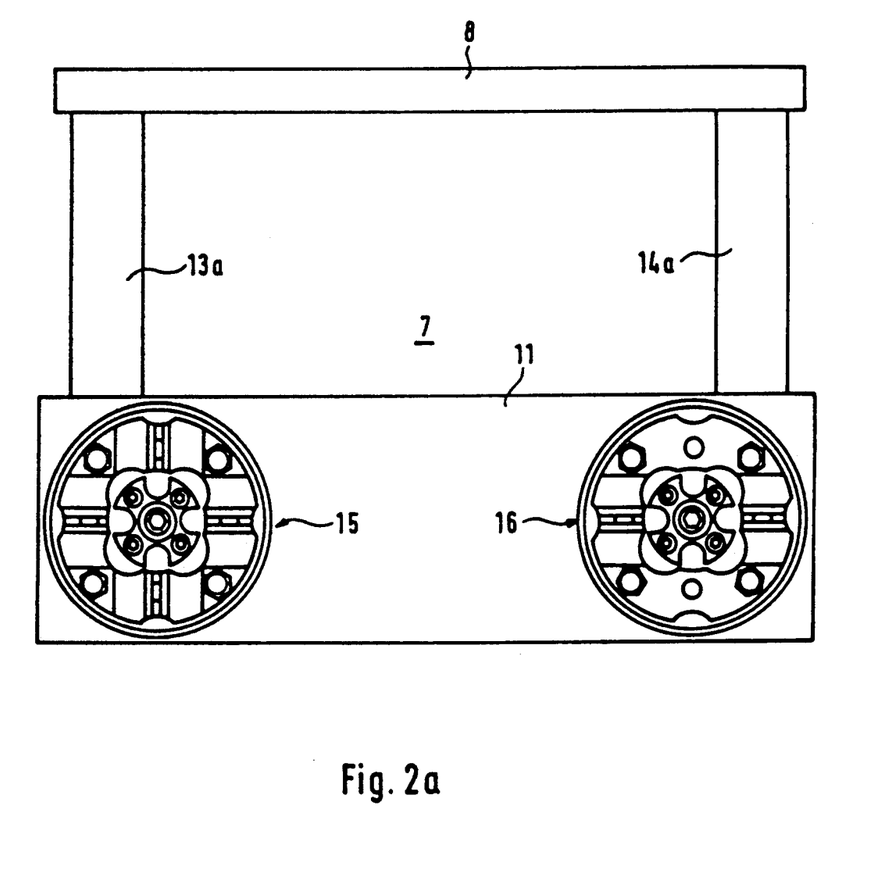
FIG. 2a shows a bottom view of a second embodiment of a workpiece receiving means which is equipped with two groups of positioning apertures.

According to FIG. 2, there is shown a similar workpiece receiving frame 7 as shown in FIG. 2, in a corresponding view; however the workpiece receiving frame 7 is provided with only two groups of positioning apertures. The frame 7 may be used with the same worktable 1 whereby only two of the base members mounted on the top of the worktable 1 are required, e.g. the two base members 4 and 5.

The workpiece receiving frame 7 is equipped with a transverse bar member 8, and the worktable 1 is equipped with a support member 9. If the workpiece receiving frame 7 is fixed to the worktable 1 the transverse bar member 8 rests on the support member 9 provided on the worktable 1. The support member 9 may be provided with an opening 10 through which pressurized air can be blown out in order to remove any dust or other contamination which may be present at the upper surface of the support member before the transverse bar member 8 of the receiving frame 7 is put on the upper surface of the support member 9.

According to FIG. 2 the workpiece receiving frame 6 comprises two transversely extending bar members which are connected to each other by means of two longitudinally extending bar members 13 and 14. The two longitudinally extending bar members 13 and 14 may be provided with receiving means for receiving the workpieces to be fixed to the workpiece receiving frame and which are to be machined. These receiving means are not shown in the drawings and it is well within the knowledge of any person skilled in the art to design such workpiece receiving means properly.

The two transverse bar members 11 and 12 each are provided with two positioning members 15, 16 and 17, 18, respectively; the design of these positioning members will be explained in detail hereinafter. The workpiece receiving frame 7 according to FIG. 2a comprises the same transverse bar member 11 as the workpiece receiving frame 6 and is provided with two positioning members 15 and 16 as well; further, the workpiece receiving frame 7 is provided with two shorter longitudinal bar members 13a and 14a and with the already mentioned transverse bar member 8 which is not equipped with any positioning members.

While the workpiece receiving frame 6 as shown in FIG. 2 is suited to receive bigger workpieces or a plurality of small workpieces and thereby has to be fixed to the worktable 1 of the machine tool at all of its four corners, the workpiece receiving frame 7 according to FIG. 2a is suited for smaller workpieces or a plurality of very small workpieces; thus, a fixing of the workpiece receiving frame 7 only by means of two positioning members 15 and 16 located at two opposite ends of the transverse bar member 11 is sufficient whereby the transverse bar member just loosely rests on the support member 9 provided at a suitable position on the worktable 1 of the machine tool.

Figure 4:
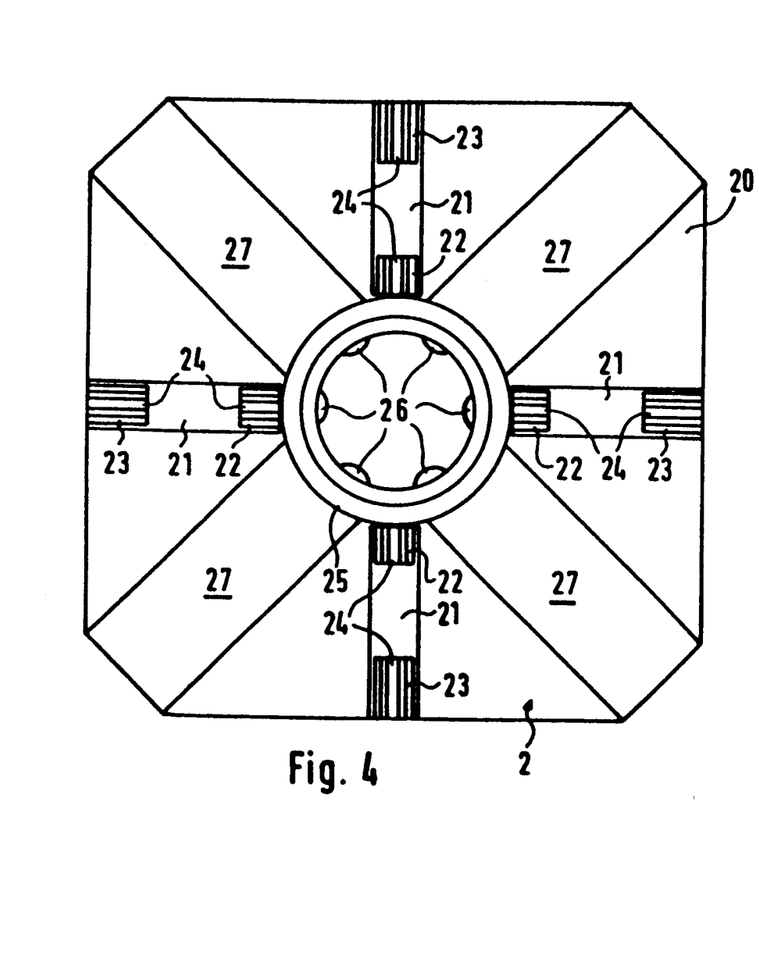
FIG. 4 shows a view of a base member having four outer and four inner positioning studs.
Figure 5:
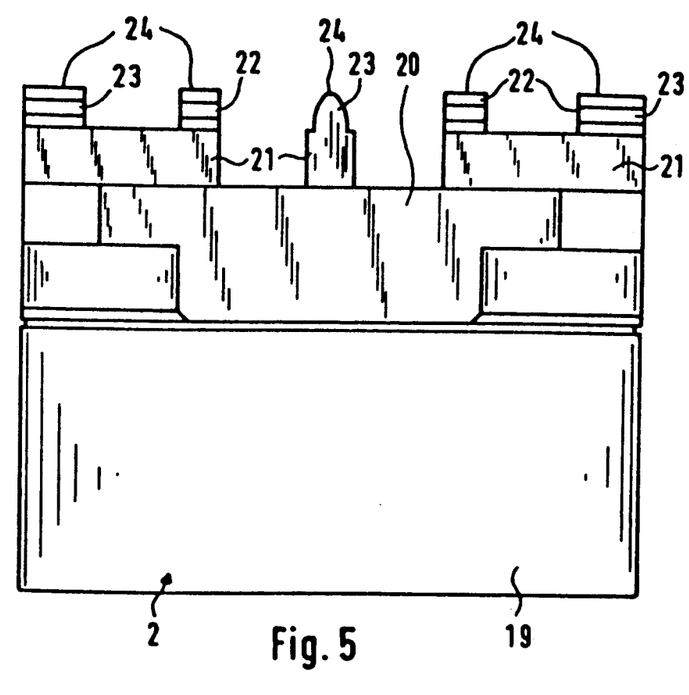
FIG. 5 shows a side view of the base member of FIG. 4.

According to FIG. 4, a base member 2 is shown in a top view while FIG. 5 shows the same base member 2 in a side view. The base member 2 comprises a cylindrical lower portion 19 and an essentially square upper portion 20, the four corners thereof being chamfered. The upper surface of the square upper portion 20 is provided with four positioning bars 21 projecting upwards from the top surface of the square upper portion 20; the four positioning bars 21 are located along the two perpendicular center lines of the square upper portion 20 of the base member 2. The upper surfaces of the positioning bars 21 are provided with positioning studs.

According to the embodiments shown in the drawings the positioning bars comprise four inner positioning studs 22 and four outer positioning studs 23. The centers of the four inner smaller positioning studs 22 are located on the periphery of a circle having a smaller diameter, and the centers of the four outer somewhat larger positioning studs 23 are located on the periphery of a second circle with a greater diameter.

The positioning studs 22 and 23 have generally wedge-shaped design and the arrangement of these studs is such that the top surfaces of two positioning studs located opposite to each other extend along a common tie line; the resulting two tie lines run in perpendicular directions with reference to each other.

Figure 6:
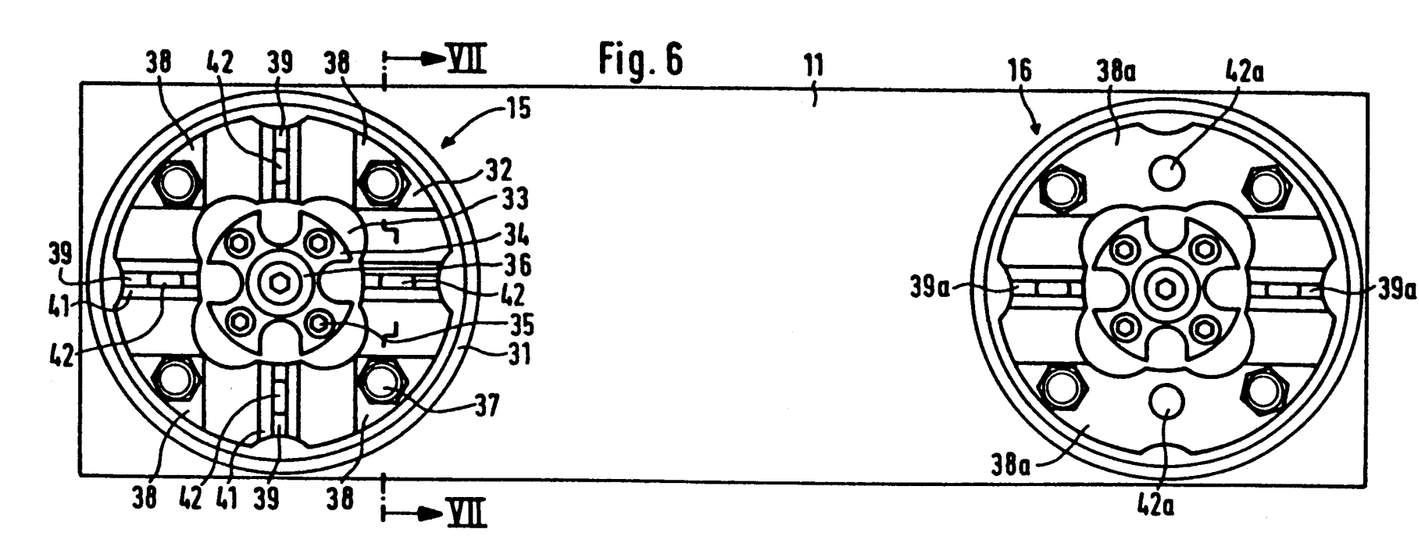
FIG. 6 shows a partial bottom view of a workpiece receiving means having two groups of positioning apertures.

In the center of the base member 2 a ball clamping device 25 is provided which includes clamping balls 26 being under the influence of (not shown) spring means and being adapted to be pneumatically activated; the ball clamping device 25 is adapted to cooperate with a tie bolt 36 shown in FIG. 6. Such a design of cooperating tie bolt and ball clamping device is well known to any person skilled in the art and must not be further discussed in this paper.

Four diagonally oriented surface portions 27 of the square upper portion 20 of the base member 2 are exactly plainly ground and serve as abutting surfaces for four distance pins which are part of the positioning members 15 to 18 of the workpiece receiving frame 6 and 7, respectively. The design of these distance pins will be explained hereinafter.

Figure 8:
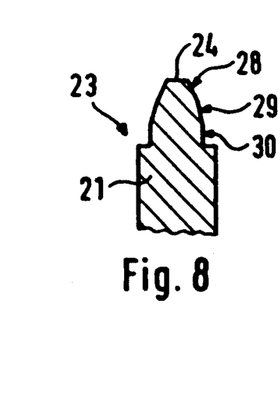
FIG. 8 shows an enlarged partial sectional view through a positioning stud.

In FIG. 8, there is shown a partial sectional view of a positioning stud whereby, as an example, the positioning stud 23 is shown. It is understood that all positioning studs, particularly also the positioning studs 22, essentially have the same design. The positioning stud 23 integrally formed with the positioning bar 21 comprises at least two inclined surfaces arranged symmetrically to each other with reference to a central plane running vertically through the positioning stud. Particularly, there are provided two first surface portions 30 adjacent to the top surface of the positioning bar 21, said first surface portions 30 running parallel to said vertically extending central plane through said positioning stud 23. Adjacent to said first surface portions 30 there are provided two second surface portions 29 having a first lower inclination with reference to said vertical plane running through the center of said positioning stud 23. Finally, adjacent to said second surface portions 29, third surface portions 28 are provided which have an inclination with reference to said central vertical plane running through said positioning stud 23 which is even greater than the inclination of said second surface portions 29.

As will be further explained hereinafter, the positioning studs 23 cooperate with positioning slits. The more inclined third surface portions 28 serve to enable or to facilitate the penetration of the positioning studs 23 into the positioning slits while the less inclined second surface portions 29 are provided to effect the real centering function.

Figure 7:
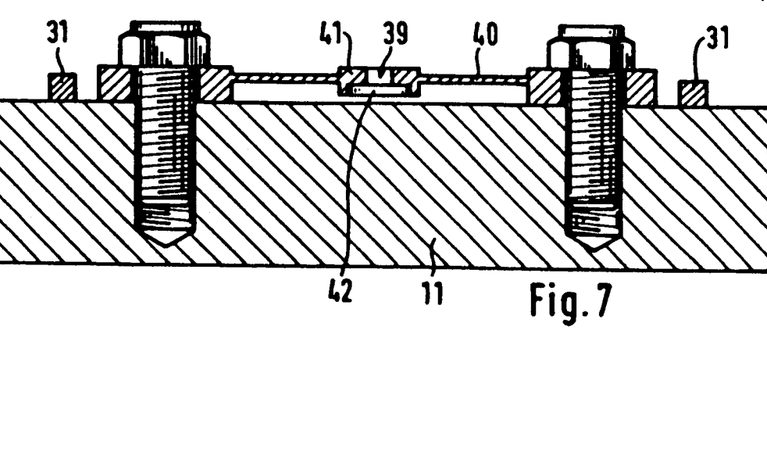
FIG. 7 shows a sectional view along the line VII—VII in FIG. 6.
Figure 9:
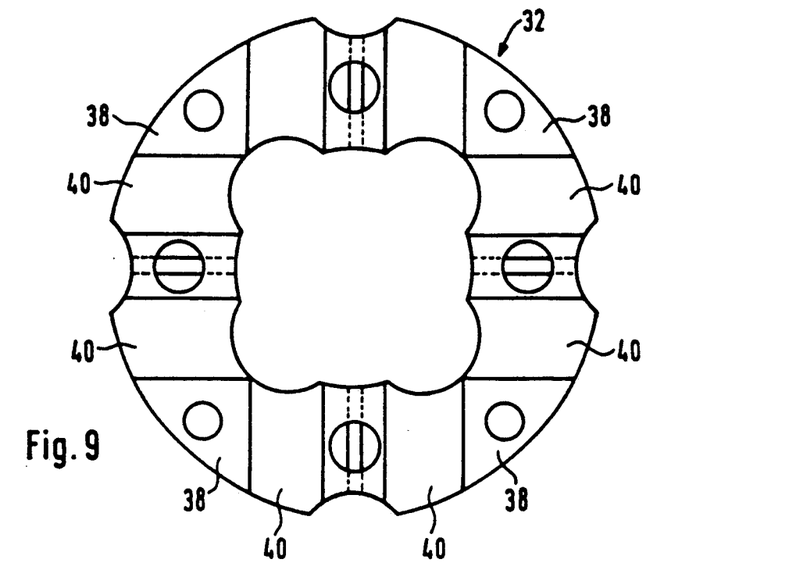
FIG. 9 shows a plan view of the face of a positioning plate which is directed towards the workpiece receiving means.

The design of the positioning members 15 and 16 is shown in FIGS. 6, 7 and 9. Those figures, respectively, show a top view of a positioning plate 32, a partial sectional view along the line VII—VII in FIG. 6 and a side view of that side which is facing the transverse bar member 11.

Figure 3:
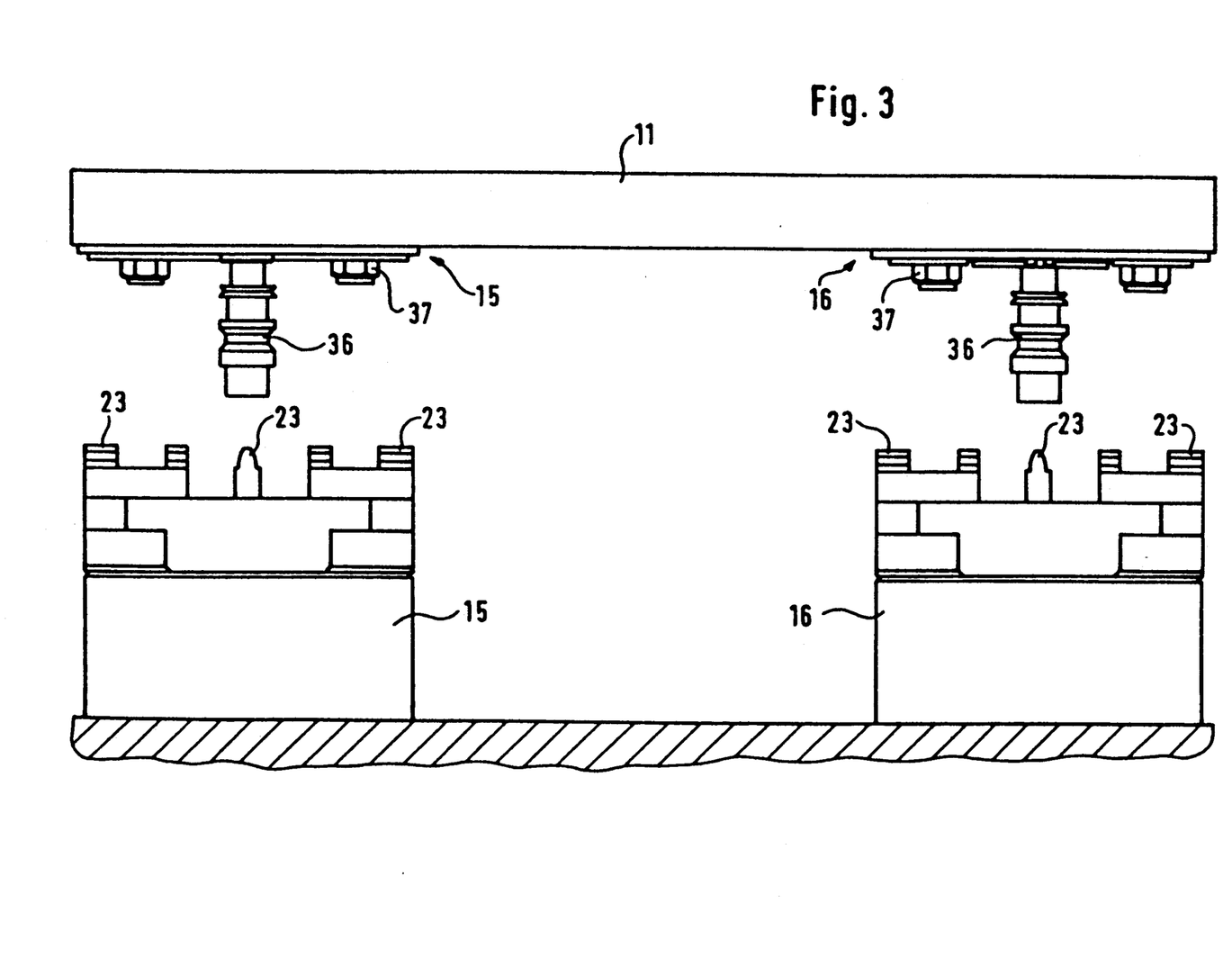
FIG. 3 shows a partially sectioned side view of the worktable and the workpiece receiving means in the direction of the arrow A in FIG. 1 and 2.

The transverse bar member 11 is provided with a circular edge rib protruding from the top surface of the transverse bar member 11. To each positioning member 15, 16, 17 and 18, a circular edge rib 31 is assigned. The edge ribs 31 serve as an anchor for a (not shown) protective hood against contamination and moisture. Within the interior of this said edge rib 31 assigned to the positioning member 15, there is provided a generally circularly shaped positioning plate 32 provided with a central aperture 33. The positioning plate 32 is provided with a receiving member 34 for a tie bolt 36 (shown in FIG. 3). The receiving member 34 is inserted into the central aperture 33 and fixed to the transverse bar member 11, e.g. by means of screws 35. The receiving member 34 supports a tie bolt 36 projecting perpendicularly from the receiving member 34 and being designed such that it fits into the ball clamping devices 25 of the base members 2 to 5.

The positioning plate 32 is fixed to the transverse bar member 11 by means of four screws 37. These screws 37 simultaneously serve as distance pins and rest with their top surfaces on the plainly ground surface portions 27 of the base members 2 to 5 as soon as the workpiece receiving frame 6 and 7, respectively, is fixed to the worktable 1 of the machine tool. Thus, the screws 37 determine the position of the workpiece receiving frame 6 and 7, respectively, and thereby the position of the workpieces to be machined and mounted on said workpiece receiving frame in Z-direction.

As can be clearly seen from FIG. 7, the positioning plate 32 comprises thickened portions at those locations where it is screwed to the transverse bar member 11. In the case of the positioning member 15, the thickened portions 38 of the positioning plate 32 are interconnected to each other by means of thin webs 40. All thin webs 40 comprise a central thickened portion 41 provided with a positioning slit 39. The thickness of the central thickened portion 41 is somewhat less than the thickness of the thickened portion 38 connected by the screws 37 to the transverse bar member 11 such that the thickened portions 41, as can be clearly seen from FIG. 7, do not rest on the surface of the transverse bar member 11.

Each two diametrally oppositely located positioning slits 39 are placed on and coincide with a straight line; the resulting two straight lines run perpendicularly to each other. The positioning slits 39 extend over the whole width of the thin webs 40 and the depth of the positioning slits 39 amounts to approximately 50–70% of the thickness of the central thickened portions 41. Finally, the central thickened portions 41 are provided with a blind bore 42 opening to the lower surface of the positioning plate 32; the position of said blind bore 42, in the present example, corresponds to the position of the outer positioning studs 23 of the base members 2–5 and the diameter thereof being somewhat more than the greatest dimension of the positioning studs 23 as seen in a sectional view running parallel to the surface of the square upper portion 20 of the base members 2–5. The width of the positioning slits 39 essentially corresponds to the width of the positioning studs 23 as measured in the middle of the less inclined second surface portions 29.

By the above described design of the positioning plate 32 incorporating the thin webs 40, the central thickened portions 41 are connected to the positioning slits 39 resiliently movable in axial direction but rigidly in circumferential direction. i.e. within the plane of the positioning plate 32. The height of the positioning studs 23 is dimensioned such that these studs displace the central thickened portions 41 by a small amount towards the transverse bar member 11 as soon as the positioning studs 23 engage the positioning slits 39. Such axial displacement is so slight that the stability in circumferential direction is not impaired at all.

The positioning member 16 is generally designed in exactly the same manner, with the following differences:

Only two positioning slits 39a are provided, being located opposite to each other in the left and in the right segment and lying in the extension of the straight line coinciding with the two positioning slits 39 of the positioning member 16 running, according to FIG. 6, in horizontal direction, i.e. in the direction of the extension of the transverse bar member 11. Consequently, the positioning member 16 does not comprise the aforementioned thin webs 40 and the central thickened portion 41 in the upper and lower segment thereof; in contrary, the two upper and the two lower thickened portions according to FIG. 6 of the positioning plate 32 are continuously connected to each other to a thickened portion 38a. The bores 42a, however, are continuous, in contrary to the blind bores 42 provided in the positioning plate 32 of the positioning member 15.

The positioning member 17 shown in FIG. 2 is identically designed to the positioning member 16 as hereinbefore described. This means that it comprises only two positioning slits as well. However, the positioning plate 32 of the positioning member 17 is mounted on the workpiece receiving frame 6 with a 90° offset with reference to the positioning member 16 such that the positioning slits 39a of the positioning member 17 run in the direction of the longitudinal extension of the longitudinal bar member 13.

The positioning plate 32 of the positioning member 18 does not comprise any positioning slits at all but only four continuous bores 42b located correspondingly to the position of the positioning studs 23. In the other respects, the design of the positioning plate 32 of the positioning member 18 is similar to that of the other positioning members.

Figure 10:
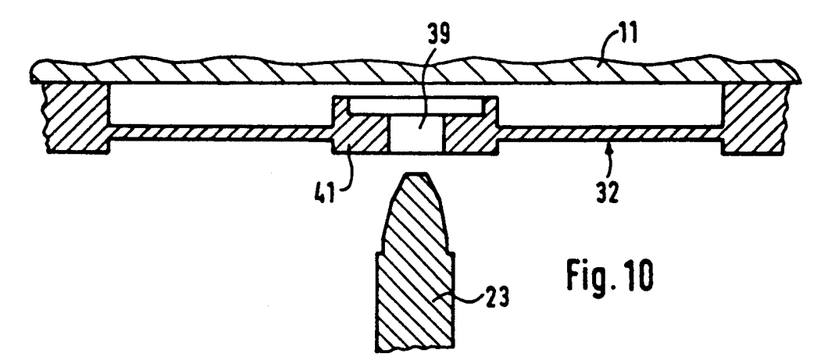
FIG. 10 shows an enlarged partial sectional view of a positioning plate and a positioning stud prior to the engagement of the positioning stud.
Figure 11:
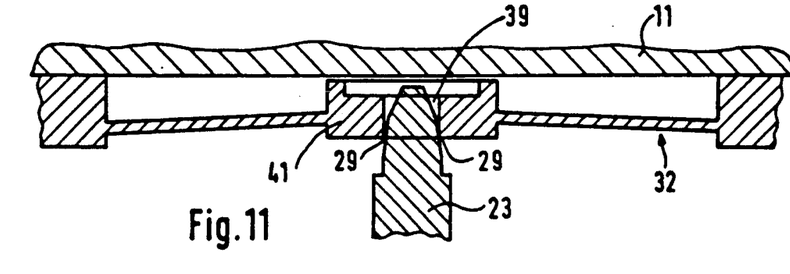
FIG. 11 shows a similar view as FIG. 10, but after the engagement of the positioning stud.

In FIGS. 10 and 11, the situation before and after the fixing of the workpiece receiving frame 6 and 7, respectively, to the worktable 1 of the machine tool provided with the base members 2 to 5 is shown in a partial sectional view. According to FIG. 10, the positioning plate 32 is in a released rest position and the positioning stud 23 is in a situation shortly prior to penetration of the positioning slit 39. According to the situation shown in FIG. 11, the workpiece receiving frame 6 is positionedly fixed to the worktable 1 of the machine tool. The positioning stud 23 has penetrated the positioning slit 39 and has thereby displaced the central thickened portion 41 of the positioning plate 32 in axial direction towards the transverse bar member 11. The less inclined lateral second surface portions 29 of the positioning stud 23 have engaged the edges of the positioning slit 39 and thereby effect an exact centering of the workpiece receiving frame 6 with regard to the worktable 1 of the machine tool.

The workpiece receiving frame 6 being fixed to the worktable 1 of the machine tool, the X/Y-reference position and thereby the position of the Z-axis is determined by the two straight lines running through opposite positioning studs 23 of the base member 5 engaging the positioning member 15. Per se, theoretically, even the angular position of the positioning member 15 and, thereby, of the workpiece receiving frame 6 is set; however, due to the relatively large dimensions of the workpiece receiving frame 6, the accuracy is not sufficient. Because of the elasticity of the material of the workpiece receiving frame 6 the position of the corner of the workpiece receiving frame 6 located diametrally opposite to the positioning member 15 could vary to an undesired extent.

In order to avoid this undesired situation, additionally, the invention provides a cooperation of the two positioning studs 23 of the base member 4 oriented in X-direction with the two positioning slits 39a of the positioning member 16 to safely fix the Y-position of the positioning member 16. The two remaining positioning studs 23 of the base member 4, thereby, do not have any function since they penetrate the continuous bores 42a of the positioning plate 32 assigned to the positioning member 16. Correspondingly, by the cooperation of the two positioning studs 23 of the base member 3 oriented in Y-direction with the two positioning slits 39b of the positioning member 17, the X-position of the positioning member 17 is exactly determined. The remaining two positioning studs 23 of the base member 3 do not have any function since they engage the continuous bores 42a of the positioning plate 32 assigned to the positioning member 17. Finally the positioning studs 23 of the base member 2 do not execute any positioning function at all since all of them engage the continuous bores 42b of the positioning member 18. By the cooperation of the base member 2 and the positioning member 18 only the Z-position of the workpiece receiving frame 6 is determined due to the fact that the distance pins provided by the screws 37 rest on the plainly ground surface portions 27 of the base member 2.

If the workpiece receiving frame 7 according to the embodiment shown in FIG. 2a is placed onto the worktable 1 of the machine tool as shown in FIG. 1, only two of the base members 2 to 5 are functionally used. Depending on the size of the workpiece receiving frame 7 and depending on the orientation thereof, either the base members 2 and 3, or the base members 2 and 4 or the base members 4 and 5 or the base members 3 and 5 engage the positioning members 15 and 16 of the workpiece receiving frame 7 shown in FIG. 2a. Thereby, by means of one of the two used base members, i.e. by that base member which engages the positioning member 15, the X/Y-reference is set while the other used base member engaging the positioning member 16 additionally sets the X- or Y-reference and thereby the angular orientation of the workpiece receiving frame 7 around the Z-axis determined by the cooperation of the positioning member 15 with the selected base member 2, 3, 4 or 5. Due to the comparatively small dimensions of the workpiece receiving frame 7 the thereby achieved accuracy is sufficient in practice.

For the sake of simplicity and in order to provide for the possibility that every arbitrary base member 2 to 5 can cooperate with the positioning member 15, depending on the orientation and the kind of the workpiece receiving frame to be used, all base members 2 to 5 are identically designed even if only at one of these base members 2 to 5 all four positioning studs 22 or 23 engage with four assigned positioning slits.

Occasionally occurring deviations of the distance between the geometric centers of two adjacent base members and two adjacent positioning members, be it due to thermal expansion or contraction, be it due to manufacturing tolerances, do not have any impairing influence on the accuracy of the position of the workpiece receiving frame with reference to the worktable of the machine tool. The position in X/Y-direction of the Z-axis is only determined by the cooperation of a single base member (e.g. base member 5 in FIG. 1) with the positioning member 15. The position of the positioning member 16 (FIG. 2) for example, which is intended to engage the base member 4, can vary in X-direction since the positioning slits 39a are sufficiently long and since the blind bores 42a and 42b are sufficiently big in order to compensate for deviations.

In the embodiment as hereinbefore described only the outer four positioning studs 23 of the base members 2 to 5 are used. The reason therefore may be seen in the fact that the positioning members of the workpiece receiving frame shown in the drawings is designed to receive a high load and to be extremely rigid. If the load exerted by the workpieces received in the workpiece receiving frame or the size of the workpiece receiving frame is lower, smaller positioning members can be used which also can have a simpler design. For example, instead of the positioning plates shown in the drawings and hereinbefore described, a simple spring steel plate can be used which is provided with four rectangular apertures equidistantly located along the periphery of a circle which are engaged by the inner positioning studs of the base members 2 to 5. Of course it must be provided for that the spring steel plate can be elastically deformed in axial direction at least in the region of the rectangular apertures, be it by distantly fixing the spring steel plate to the transverse bar member, be it by providing recesses in the transverse bar member located in the region of the rectangular apertures, in the spring steel plate. Anyway, the same base members 2 to 5 can be used with both kinds of positioning members.

The apparatus according to the invention offers, besides an extraordinary flexibility in the design of the workpiece receiving means, a very high precision as far as the accuracy of the position of the workpiece receiving means with reference to the worktable of the machine tool is concerned. The apparatus of the invention is of simple design and can be manufactured at low costs. Furthermore, the operation of the apparatus of the invention is not impaired by contamination since the system "positioning stud/positioning slit" is self-cleaning. Finally, it should be mentioned that the apparatus of the invention is hardly subjected to wear and if wear occurs, it does not affect the positioning precision at all; if the positioning studs and/or positioning slits should somewhat wear out due to extended use, the only result is that the positioning plate 32 with its central thickened portion 41 is displaced somewhat less in axial direction; however, the accuracy of the positioning is not impaired thereby at all.

What I claim is:

1. An apparatus for fixing a workpiece to be machined by a machine tool to the worktable of said machine tool in an exactly determined positional relationship with reference to a reference point located on said worktable of said machine tool, said apparatus comprising:

a workpiece receiving means adapted to removably receive said workpiece to be machined;

first positioning means comprising a first group of positioning apertures provided in said workpiece receiving means and a first group of positioning studs provided on said worktable of said machining tool, said first group of positioning apertures and said first group of positioning studs cooperating to determine the position of said workpiece receiving means in X- and Y-directions;

second positioning means comprising a second group of positioning apertures and a second group of positioning studs, said second groups of positioning apertures and positioning studs being located distantly from said first groups of positioning apertures and positioning studs and cooperating with each other whereby said cooperating second groups of positioning apertures and positioning studs determine the position of said workpiece receiving means either only in the X-direction or only in the Y-direction; and said workpiece receiving means comprises at least two positioning members located distantly from each other, each of said positioning members comprising a positioning plate, the positioning plate of a first positioning member being provided with four positioning slits, the arrangement of said four positioning slits corresponding with the arrangement of the positioning studs of said first group of positioning studs, and the positioning plate of a further positioning member being provided with two positioning slits which are located on the tie line running from the center of said first positioning member to the center of said further positioning member.

2. An apparatus for fixing a workpiece to be machined by a machine tool to the worktable of said machine tool in an exactly determined positional relationship with reference to a reference point located on said worktable of said machine tool, said apparatus comprising:

a workpiece receiving means adapted to removably receive said workpiece to be machined;

first positioning means comprising a first group of positioning apertures provided in said workpiece receiving means and a first group of positioning studs provided on said worktable of said machining tool, said first group of positioning apertures and said first group of positioning studs cooperating to determine the position of said workpiece receiving means in X- and Y-directions;

second positioning means comprising a second group of positioning apertures and a second group of positioning studs, said second groups of positioning apertures and positioning studs being located distantly from said first groups of positioning apertures and positioning studs and cooperating with each other whereby said cooperating second groups of positioning apertures and positioning studs determine the position of said workpiece receiving means only in the X-direction;

third positioning means comprising a third group of positioning apertures and a third group of positioning studs, said third groups of positioning apertures and positioning studs being located distantly from said first and second groups of positioning apertures and positioning studs and cooperating with each other whereby said cooperating third groups of positioning apertures and positioning studs determine the position of said workpiece receiving means only in the Y-direction; and said workpiece receiving means comprises at least two positioning members located distantly from each other, each of said positioning members comprising a positioning plate, the positioning plate of a first positioning member being provided with four positioning slits, the arrangement of said four positioning slits corresponding with the arrangement of the positioning studs of said first group of positioning studs, and the positioning plate of a further positioning member being provided with two positioning slits which are located on the tie line running from the center of said first positioning member to the center of said further positioning member.

3. An apparatus according to claims 1 or 2 wherein said workpiece receiving means comprises a rectangular frame whereby a positioning member is arranged at each of the four corners of said frame.

4. An apparatus according to claim 3 wherein said rectangular frame comprises a positioning member having four positioning slots at a first corner, a positioning member having two positioning slots at the two adjacent corners and a positioning member without positioning slots at a fourth corner opposite to said first corner.

5. An apparatus according to claims 1 or 2 wherein the positioning plates of all positioning members are fixed to the workpiece receiving means by means of four distance bolts.

6. An apparatus according to claims 1 or 2 wherein the positioning plates of those positioning members which have only two positioning slots or which have no position slots are provided with continuous apertures instead of the positioning slots, the positioning studs of the corresponding base member passing through the related apertures when said positioning members rest on said base members.

7. An apparatus according to claims 1 or 2 wherein the positioning plate of said first positioning member comprises four thickened portions located in the region of said distance bolts as well as four central portions located in the center between two of said thickened portions, said central portions being connected to said thickened portions by means of thin resilient webs and said central portions comprising said positioning slits.

8. An apparatus according to claim 2 wherein the positioning plate of each of said second and third positioning members comprises two thickened portions located opposite to each other between two adjacent distance bolts as well as two central portions located in the center between said two thickened portions, said central portions being connected to said thickened portions by means of thin resilient webs and said central portions comprising said positioning slits.

9. An apparatus according to claim 7 wherein said central portions are somewhat thinner than said thickened portions and are located somewhat offset backwards relative to that surface of said thickened portions which faces the workpiece receiving means such that said central portions may resiliently be displaced towards said workpiece receiving means.

10. An apparatus according to claim 8 wherein said central portions are somewhat thinner than said thickened portions and are located somewhat offset backwards relative to that surface of said thickened portions which faces the workpiece receiving means such that said central portions may resiliently be displaced towards said workpiece receiving means.

11. An apparatus according to claims 1 or 2 wherein each of said positioning members is provided with a central tie bolt projecting away from said positioning member.

* * * * *